W. BEAUCHAMP.
PUMP BUCKET.

No. 179,838.

Patented July 18, 1876.

Witnesses.
Daniel Reigart.
W. E. Shaffer

William Beauchamp
Inventor
By his Atty T. F. Reigart.

UNITED STATES PATENT OFFICE.

WILLIAM BEAUCHAMP, OF EVANSVILLE, INDIANA.

IMPROVEMENT IN PUMP-BUCKETS.

Specification forming part of Letters Patent No. 179,838, dated July 18, 1876; application filed May 3, 1876.

*To all whom it may concern:*

Be it known that I, WILLIAM BEAUCHAMP, of Evansville, Vanderberg county, State of Indiana, have invented an Improved Elastic Bucket for Pumps; and I do hereby declare the following to be an exact description thereof, reference being had to the accompanying drawings, and to the letters of reference marked thereon, making a part of this specification, in which—

Figure 1:
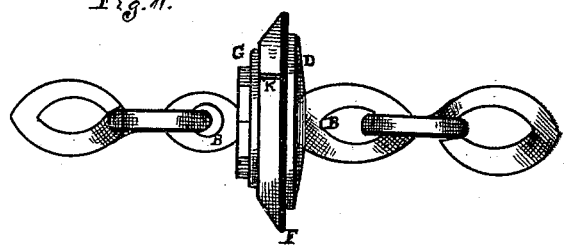
Figure 2:
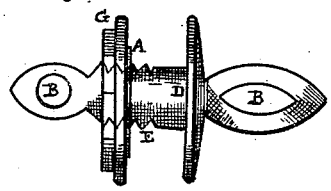
Figure 3:
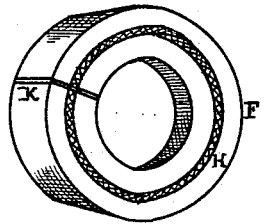

Figure 1 represents a side view of the elastic bucket as connected to a link-chain. Fig. 2 represents a side view of the flanges, head-bolt, screw, and nut, and eyes at each end. Fig. 3 is a perspective view of the beveled-edged rubber bucket.

The nature of my invention consists in the construction and combination of the eyes B B, flange-headed bolt D, flanged nut G, and projecting ring A on the face of nut G, screw-thread E, beveled-edged rubber bucket F, groove H in the side of the bucket, and the slit K in the rubber bucket F.

To enable others skilled in the art to make and use my invention, I will describe it as follows:

The eyes B B are cast solid to the flanged head-bolt D, thereby avoiding the danger of the eyes working apart, as is often the case when the eyes are made in separate parts.

On the end of the bolt D are screw-threads, cut as shown at E, to correspond with the screw-threads of the nut G, the rubber bucket F being placed between the flanged head of the bolt D and the flanged nut G, by opening the slit K of the rubber bucket F.

The flanged nut G is made with a projecting ring, A, on the face, to correspond with the groove H in the rubber bucket F, for the purpose of holding the bucket from being drawn from its proper place when the chain is in operation, the rubber bucket F having a beveled edge, and made with a slit, K, through one side of it, for the purpose of fitting it between the flanged bolt D and flange-nut G without unlinking or taking apart the chain.

What I claim as my invention, and desire to secure by Letters Patent, is—

1. The combination of the flange-headed bolt D, eyes B B, screw-threads E E, corresponding nut G, and projecting ring A on nut G, when constructed and combined as herein described and set forth.

2. The rubber bucket F, having the slit K fitted between the flange-head of bolt D and flanged nut C by means of the projecting ring A in the face of nut G, and the corresponding ring H in the bucket, as herein described, and for the purposes set forth.

WILLIAM BEAUCHAMP.

Witnesses:
J. FRANKLIN REIGART,
E. C. MOORE.